Nov. 20, 1928.
W. C. BARRIER
1,692,365
APPARATUS FOR SCALDING POULTRY
Filed Feb. 16, 1928   3 Sheets-Sheet 1
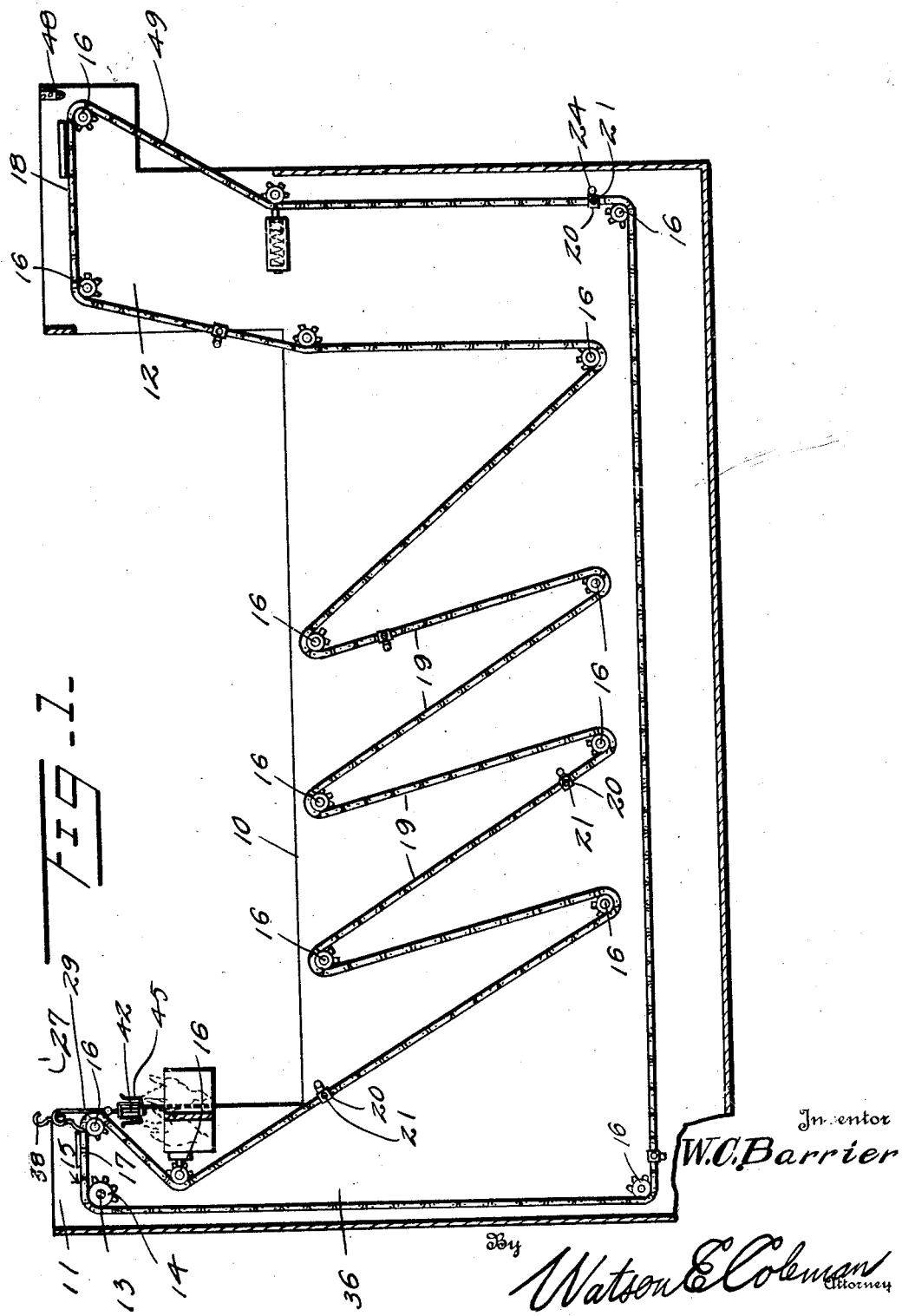

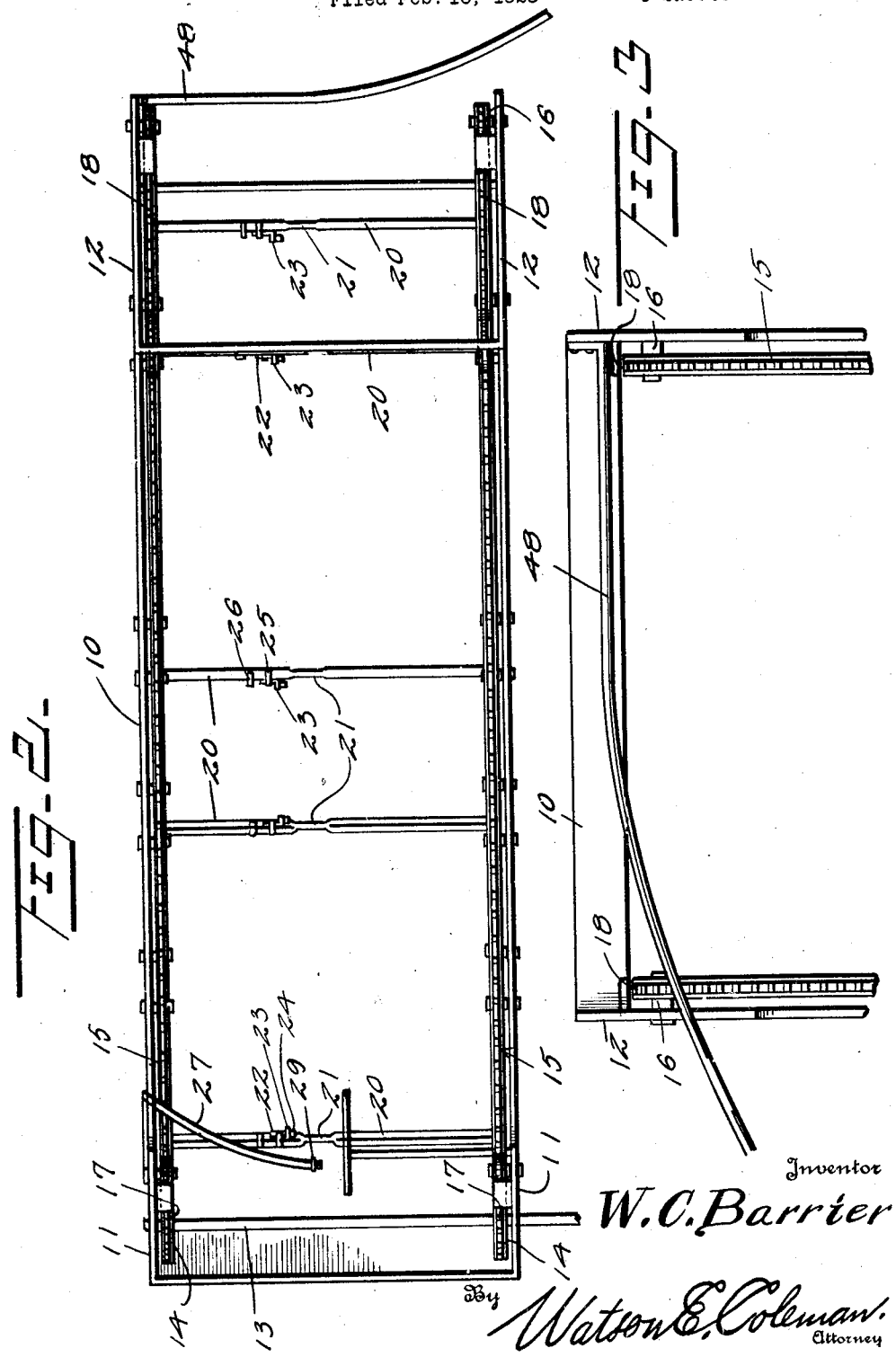

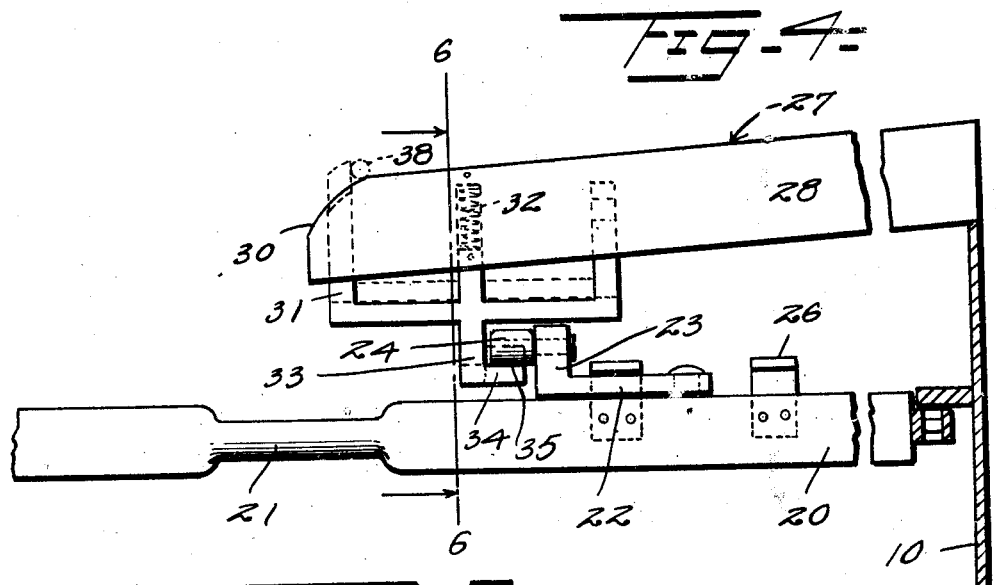

Patented Nov. 20, 1928.

1,692,365

UNITED STATES PATENT OFFICE.

WILLIAM C. BARRIER, OF FREMONT, NEBRASKA, ASSIGNOR OF ONE-THIRD TO HOWARD W. LOOMIS, OF FREMONT, NEBRASKA.

APPARATUS FOR SCALDING POULTRY.

Application filed February 16, 1928. Serial No. 254,801.

This invention relates to apparatus for scalding poultry.

An important object of the invention is the provision in a device of this character of an apparatus such that supports upon which the poultry is arranged may be automatically removed from the slides by means of which they are usually, in poultry plants of any size, delivered from the killer to the scalding apparatus and to the pickers.

A further object of the invention is to provide a device of this character which likewise includes means for automatically removing the poultry supports and placing them upon a slide by means of which they may be delivered to the pickers.

A still further object of the invention is the provision of a device of such construction that the fowls in their passage through the scalding tank are presented to the fluid therein while moving at varying angles, so that the fluid has a chance to thoroughly penetrate the feathers and properly prepare the bird for picking.

A still further object of the invention is to provide a construction of such character that comparatively little space is occupied by the tank other than would be occupied by the ordinary scalding tank.

These and other objects I attain by the construction shown in the accompanying drawings, wherein for the purpose of illustration is shown a preferred embodiment of my invention and wherein:—

Figure 1 is a longitudinal sectional view through a chicken scalding apparatus constructed in accordance with my invention;

Figure 2 is a plan view thereof;

Figure 3 is a rear end elevation thereof;

Figure 4 is a detail view showing the operation of the carrier bars in releasing the latch of the delivery slide;

Figure 5 is a detail view showing the poultry support in engagement with the carrier bar, the dotted line of the carrier bar showing the position thereof when the poultry carrier is about to drop thereon;

Figure 6 is a section on the line 6—6 of Figure 4;

Figure 7 is a section on the line 7—7 of Figure 5.

Referring now more particularly to the drawings, the numeral 10 generally designates a scalding tank having extended upwardly therefrom at opposite ends thereof opposed pairs of standards 11 and 12. The walls of the tank preferably at the standards 11 have extended therethrough a rotating drive shaft 13 having in close proximity to the inner faces of the standards sprockets 14 over which are passed chains 15. The chains 15 from the sprockets 14 are passed over a series of sprockets 16 which are provided in opposed pairs, one sprocket of each pair being supported by one of opposed faces of the sides of the tank or the standards 11 or 12. One of these sprockets of each chain is so aligned that the sprocket 14 of the drive shaft 13 with each chain at the upper end of the standards 11 has a short horizontal section, indicated at 17. Two adjacent sprockets carried by the standards 12 provide a second horizontal travel section for the chains, indicated at 18. Between the horizontal sections 17 and 18, the sprockets are arranged to provide dipping sections 19, of which adjacent sections are arranged at angles to one another and in such fashion that while the aggregate travel is longitudinal, a vertical reciprocation of a given point in the chain is effected.

Corresponding links of the chain at substantially equidistantly spaced points are connected by carrier bars 20, each of which has a reduced central portion 21, which is circular in cross section. Adjacent this reduced section, each carrier bar has pivotally connected thereto an arm 22, the end of which has a flange 23 providing a mounting for a roller 24 having an axis substantially paralleling the axis of the carrier bar. This arm is swingable about the pivot thereof to selectively engage stops 25 and 26. When engaged with the stop 25, the arm is in operative position and when engaged with the stop 26, it is in inoperative position, as will hereinafter more fully appear.

The numeral 27 generally designates a loading device comprising a slide bar 28 along which poultry supports, generally designated at 29 and hereinafter to be more fully described, may slide preferably by gravity. One end of this slide, in the gravity type herein illustrated the lower end, overlies the center of the space beneath the chains at such point that the carrier bars 20 pass immediately therebeneath. This end of the bar is acutely sloped, as indicated at 30, and through this sloping face is directed a latch element 31 which, by a spring 32, is normally maintained projecting above the upper surface of the base 30, so that it will engage and stop a carrier moving therealong. This latch has an extension 33 providing a horizontally extending wedge-shaped striker 34 which, when an arm 22 of the carrier bar is arranged in engagement with the stop 25, will be engaged by the roller 24, so that the latch is withdrawn to permit the poultry support 29 to escape from the end of the bar and fall to the carrier. Complete release does not take place until the roller is approximately engaged with the peak 35 of the cam or striker 34, so that the latch is almost immediately released to prevent the escape of more than one support. Auxiliary means can be provided to this end, if so desired.

The standards 11 preferably mount a bumper 36 against which the poultry engages when it arrives at the latch to prevent undue swinging movement thereof, such as might cause escape of the support from the latch or cause improper engagement of the support with the carrier bar.

The poultry support comprises a standard 37 which is provided at its upper end with a hook 38 and below its upper end with a second hook 39 facing oppositely from the hook 38. The hook 39 has the bill 40 thereof in slightly less spaced relation to the reduced central portion 21 of the carrier bar 20 and this bill is provided with an extension 41 diverging downwardly from the standard. Pivoted to the lower end of the standard is a guide 42 circular in cross section and having at its lower end a head 43. A pair of disks 44 surrounding this guide have secured thereto the inner arms of U-shaped members 45, the outer arms of which are deflected outwardly adjacent their upper ends, as indicated at 46. The inner faces of both the inner and outer arms are provided with teeth 47. Both the standard and the U-shaped members are formed of resilient material. Extending into proximity to the rear end of the horizontal travel section 18 is the upper end of a slide 48.

Operation of the device is as follows: Poultry to be killed is secured to the support 29 by engaging the legs thereof between the arms of the U-shaped member, the teeth of these arms serving to firmly grasp the legs and resist withdrawal or displacement thereof. After killing of the chickens, the supports are passed downwardly over the guide 27 until they arrive at the latch. It will be noted that the side faces of the slide are straight and that the standard 29 is straight, so that it lies flatly thereagainst and prevents oscillation of the support in one direction. Oscillation in a direction longitudinal to the support is checked when the poultry engages against the stop 36. After the poultry is engaged with the stop, the trip roller 24 of the first carrier bar 20 to pass the slide 27 will withdraw the latch 31, permitting the support to fall from the guide to the bar. The bar engaging between the extension 41 of the bill and the standard 29 is guided into the bight of the hook 39 and due to the weight of the suspended load and the force generated in the fall, the bill 40 is sprung open to permit the section 21 of the bar to pass therethrough. The support with its load then begins its downward travel into the tank and is successively moved downwardly and upwardly in the tank. The pivotal connection between the standard and guide will permit the guide to oscillate with relation to the standard to compensate for any deflection resulting from flotation from the body of the fowls. The disks 44 being vertically shiftable through certain limits upon the guide also assist in compensating for this factor. Arriving at the period of horizontal travel, the hooks 38 engage over slides 48 and as the downward travel of the chains begins at 49 are elevated from the carrier bars, so that the supports may slide upon the slides 48 to the pickers.

It will be obvious that by employing an apparatus of this character, the handling of the fowls during their passage from the killer to the pickers may be made entirely automatic. In some instances, it will be impossible for the pickers to handle the fowls as rapidly as they could be passed through the scalding operation and, under such circumstances, the trip roller arms 22 of certain of the bars are swung out of engagement with their stops 25 and into engagement with their stops 26, so that the rollers 24 are no longer positioned to engage the strikers 34 and cause withdrawal of the latch. Bars thus treated will pass the guide 27 without receiving a support 29 therefrom.

Since the construction hereinbefore set forth is capable of a certain range of change and modification without materially departing from the spirit of the invention, I do not limit myself to such specific structure except as hereinafter claimed.

I claim:—

1. In poultry scalding apparatus, a tank, carrier bars, means for causing the bars to travel longitudinally of the tank in opposite directions, slides at opposite ends of the tank, poultry supports slidable thereon and when engaged with one of the slides moving toward the tank and when engaged with the other thereof moving away from the tank, the end of the first named slide being disposed over the carrier bars at the beginning of their longitudinal travel in one direction and having a latch preventing the passage of the poultry supports thereover, means operated by the passage of a bar releasing said latch, means upon the poultry support engaging the bar releasing the latch when the poultry support falls from the slide, and means upon said standards and engaging the other of the slides at the opposite end of the travel for withdrawing the poultry supports from the bars.

2. A device as claimed in claim 1, wherein the means upon the poultry supports engaging the bars constitute hooks, the bars at the point of engagement of the poultry supports therewith are of greater diameter than the mouth of the hook so that the hook must be sprung to pass thereover and the slide delivering the poultry supports to the tank is spaced above the bars, so that the weight of the supports and the supported poultry supplies the force necessary to spring the hook over the carrier bar.

3. A device as claimed in claim 1, wherein the means causing the bars to travel longitudinally of the tank during the period of travel of the bars after application of a poultry support thereto and before removal of the poultry support therefrom causes the bars to be alternately extended into and withdrawn from fluid contained in the tank.

4. A device as claimed in claim 1, wherein the latch of the slide has an extension forming a striker and the carrier bars are each provided with a roller for engagement with the striker which upon engagement therewith withdraws the latch 5. A device as claimed in claim 1, wherein the latch of the slide has an extension forming a striker and the carrier bars are each provided with a roller for engagement with the striker which upon engagement therewith withdraws the latch, the roller being mounted upon a pivoted arm shiftable to a position where it will escape the striker and permit the arm to pass the slide without release of the latch.

6. In poultry scalding apparatus, a tank, carrier bars and means for causing the bars to travel longitudinally of the tank in opposite directions, poultry supports, a slide upon which the poultry supports are slidable toward the tank, the end of said slide being disposed over the carrier bars at the beginning of their longitudinal travel in one direction and having a latch preventing the passage of the poultry supports thereover, means operated by the passage of a bar releasing said latch, and means upon the poultry support engaging the bar releasing the latch when the poultry support falls from the slide.

7. A device as claimed in claim 6, wherein the means upon the poultry supports engaging the bars constitute hooks, the mouths of which are of less diameter than the bars at the point of engagement of the supports therewith whereby the hook must be sprung to pass over the bar and the slide delivering the poultry supports to the tank is spaced above the bars as they pass thereunder so that the weight of the supports and poultry supported therefrom supplies the force necessary to spring the hook over the carrier bar.

8. A device as claimed in claim 6, wherein the means causing the bars to travel longitudinally of the tank during the period of travel of the bars after application of a poultry support thereto and before removal of the poultry support therefrom causes the bars to be alternately extended into and withdrawn from fluid contained in the tank.

9. A device as claimed in claim 6, wherein the latch of the slide has an extension forming a striker and the carrier bars are each provided with a roller for engagement with the striker which upon engagement therewith withdraws the latch.

10. A device as claimed in claim 6, wherein the latch of the slide has an extension forming a striker and the carrier bars are each provided with a roller for engagement with the striker which upon engagement therewith withdraws the latch, the roller being mounted upon a pivoted arm shiftable to a position where it will escape the striker and permit the arm to pass the slide without release of the latch.

11. A device as claimed in claim 6, wherein the means upon the poultry supports engaging the bars have engagement therewith requiring the application of force to permit their removal therefrom.

12. A device as claimed in claim 6, wherein the means upon the poultry supports engaging the bars have engagement therewith requiring the application of force to permit their removal therefrom and means are provided at the opposite end of the travel in said direction having engagement with the poultry supports applying force to withdraw the same from the bars.

13. In a device of the character described as a sub-combination, a standard having oppositely facing hooks, a guide pivoted to the lower end of the standard and gripping devices for engagement with the legs of poultry rotatable and longitudinally shiftable upon the guide.

14. In scalding apparatus, a scalding tank, carrier bars, means for causing the bars to travel longitudinally of the tank in a vertically sinuous path, and means for securing bodies to be scalded to said bars, the sinuous travel of said bars causing said bodies to move alternately in opposite directions in the liquid in the tank.

15. In scalding apparatus, a scalding tank, carrier bars, means for causing the bars to travel longitudinally of the tank in a sinuous path and body supports requiring the use of force in their application or removal engaging the bars, the sinuous travel of said bars causing the bodies carried by said supports to move alternately in opposite directions in the liquid in the tank.

In testimony whereof I hereunto affix my signature.

WILLIAM C. BARRIER.